Figure 1:
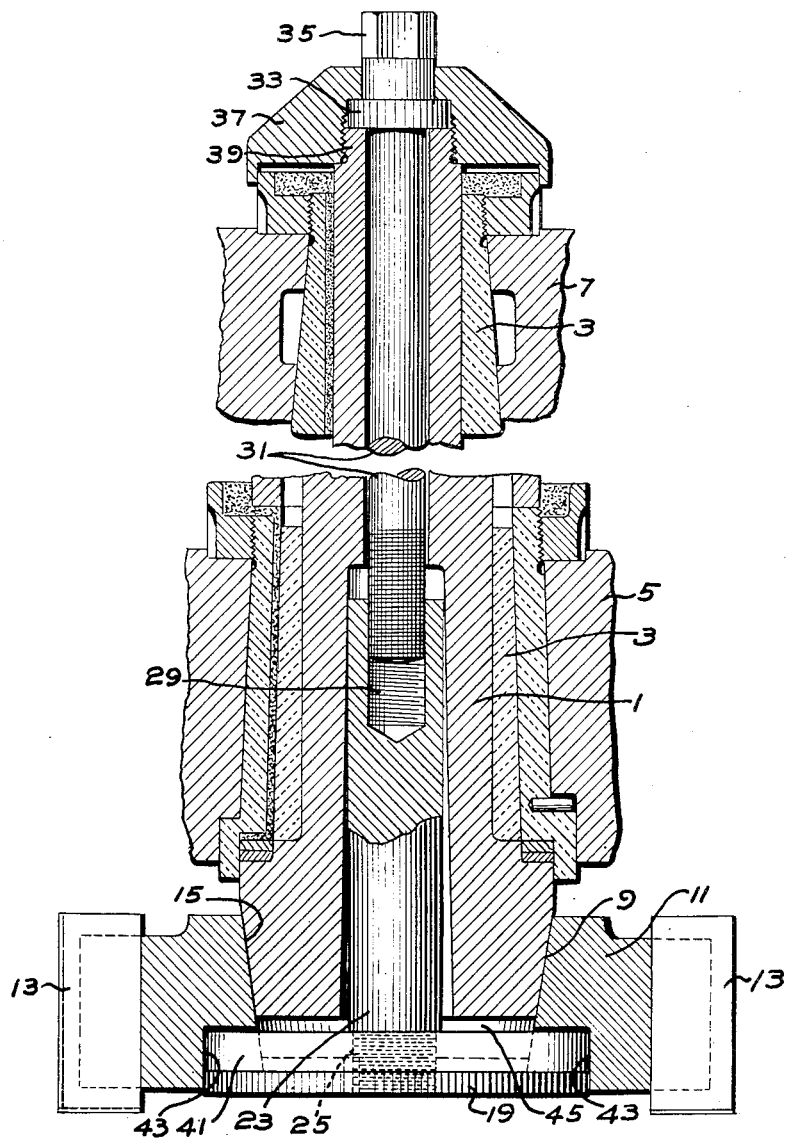

W. F. GROENE.
DEVICE FOR CONNECTING TOOLS TO SPINDLES.
APPLICATION FILED OCT. 1, 1918.

1,337,313.

Patented Apr. 20, 1920.

2 SHEETS—SHEET 1.

W. F. GROENE.
DEVICE FOR CONNECTING TOOLS TO SPINDLES.
APPLICATION FILED OCT. 1, 1918.

1,337,313.

Patented Apr. 20, 1920.

2 SHEETS—SHEET 2.

Inventor:
William F. Groene
by Robt. P. Hains,
Attorney

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF OHIO.

DEVICE FOR CONNECTING TOOLS TO SPINDLES.

1,337,313. Specification of Letters Patent. Patented Apr. 20, 1920.

Application filed October 1, 1918. Serial No. 256,450.

*To all whom it may concern:*

Be it known that I, WILLIAM F. GROENE, a citizen of the United States, residing at Cincinnati, county of Hamilton, and State of Ohio, have invented an Improvement in Devices for Connecting Tools to Spindles, of which the following description, in connection with the accompanying drawings, is a specification, like characters on the drawings representing like parts.

The invention to be hereinafter described relates to devices for securing tools to the spindles of milling machines and other machine tools.

In Letters Patent of the United States No. 963,935 granted to J. Parker, July 12, 1910, is shown a device for securing a cutter to a spindle, comprising a plate connected to a draw-bolt extending through the spindle for drawing a tapered bore of the cutter onto a tapered portion of a split sleeve threaded to the spindle, thereby tightening the sleeve to the spindle. To prevent slip between the sleeve and cutter, a key is inserted into key-ways in the sleeve and cutter.

There are certain objections to this construction. Among others, it is necessary to provide the split sleeve, thread the sleeve, thread the nose of the spindle, cut key-ways in the sleeve and spindle, and form the key and secure the same in the key-way of the spindle. This unnecessarily adds to the cost of construction, and in use the threads on the sleeve and the nose of the spindle are liable to be knocked, mutilated and worn; and dirt particles will collect in the threads and interfere with the proper grip of the sleeve to the spindle. The conical bore of the cutter must be driven so tightly onto the conical periphery of the sleeve to insure proper drive of the cutter, that removal of the cutter from the spindle is a difficult operation. The small key inserted in the key-ways of the sleeve and cutter is in an objectionable location and is an inefficient driving means. Cutters for certain purposes must be very small in diameter and the provision of the sleeve between the cutter and spindle renders impracticable the use thereof for small cutters.

The present invention, among other objects, overcomes the objections to the tool driving device of said patent, and provides a simple, strong driving member which eliminates the necessity for said sleeve and is located and arranged to drive small as well as large cutters. Since this strong driving member is relied upon to drive the tool from the spindle, it is unnecessary to draw the conical bore of the tool onto the conical nose of the spindle so tightly, but that the tool may be readily removed when desired. And another object is to provide a driving member which may coöperate with a draw member or bolt, serving the dual function of drawing the tapered bore of the tool onto the tapered nose of the spindle, and securing the driving member into recesses in said parts for positive driving engagement therewith.

With the aforesaid and other objects in view, the character of the invention may be best understood by reference to the following description of one good form thereof shown in the accompanying drawings, wherein:—

Figure 2:
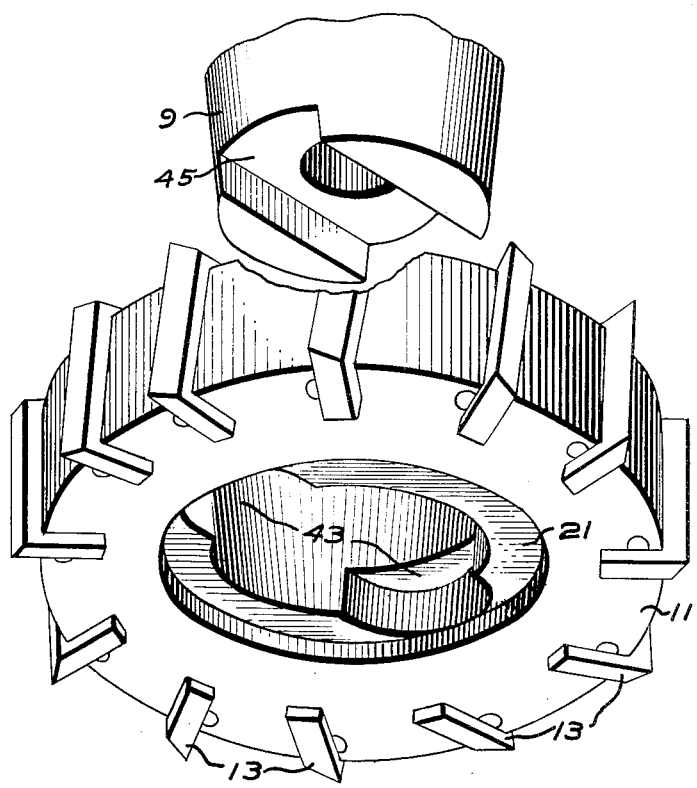
Figure 2:
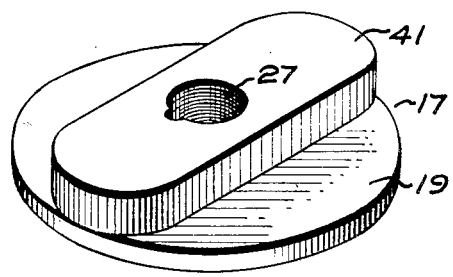

Figure 1 is a longitudinal section through a spindle and a cutter connected by a securing device embodying the invention; and Fig. 2 is a perspective view of the nose of the spindle, the cutter, and a part of the securing device embodying the invention.

Referring to the drawings, 1 (Fig. 1) designates a hollow spindle journaled in bushings 3 in bearings 5 and 7 of a milling machine or other machine tool. This spindle may have a tapered portion, in the present instance, in the form of a conical or tapered nose 9 at one end of the spindle.

Tools of varying character may be secured to the spindle, but for purposes of illustration, a rotary cutter is shown herein comprising a body 11 having cutter teeth 13 secured in notches in the periphery of the cutter. The body of the cutter may have a central bore 15 therein, conical or tapered to fit the tapered nose of the spindle.

Suitable means is provided for drawing the tapered bore of the cutter onto the tapered nose of the spindle. To accomplish this, in the present instance, a member 17 may be provided conveniently in the form of a disk 19 adapted to engage a suitable part of the cutter. In the present instance, the cutter is provided with a recess or counterbore 21 adapted to receive the disk 19.

To draw the disk 19 against the base of the counterbore 21, and draw the tapered bore of the cutter onto the tapered nose of the spindle, suitable means may be provided, in the present instance, in the form of a draw bar 23 (Fig. 1) having a reduced end 25 threaded into a hole 27 in the member 17. The draw bar 23 is adapted to project into the hollow spindle, and the opposite end of said bar may be provided with a socket 29 tapped to receive the threaded end of a draw bolt 31 having a flange 33 for engagement with the end of the spindle opposite to the end receiving the cutter, and having a head 35 slabbed off to receive a wrench or other suitable tool. A collar 37 has a counterbore threaded to a reduced end 39 of the spindle, and the base of said counterbore serves as a shoulder to engage the flange 33 and to secure the draw bolt in its positions of adjustment.

The construction is such that the draw bolt may be screwed into the tapped socket of the draw bar, and will thereby press the disk 19 against the base of the counterbore 21, and draw the conical bore of the cutter onto the tapered nose of the spindle. Then the collar 37 may be tightened onto the spindle to secure the draw bolt.

Suitable means may be provided to rotate the cutter positively from the spindle. To accomplish this, in the present instance, the member 17, referred to, may be provided with a driving bar or member 41 (Fig. 2), and the cutter may be formed to present diametrically opposed recesses or notches 43 adapted to register with a recess or groove 45 in the end of the nose of the spindle and extending transversely to the axis of the spindle.

The construction is such that when the disk 19 is drawn into the counterbore 21, the driving bar or member 41 will enter the registering recesses 43 and 45 and serve to positively drive the cutter from the spindle. The groove or recess 45 in the nose of the spindle has sufficient depth to allow the member 17 to draw the tapered bore of the cutter onto the tapered nose of the spindle without interference from said recess or groove 45.

By my invention simple and effective means is provided for securing the cutter to the spindle. The parts may be easily and quickly assembled, and the securing device will serve the dual function of holding the cutter on the spindle without lost motion, and positively connecting the cutter and spindle by a strong driving member which will withstand the strain and hard usage which tools of this character experience.

When it is desired to remove the cutter, it is merely necessary to unscrew the draw bolt which will react against the tightening collar 37 and move the draw bar and the member 17 connected therewith outward. The engagement of the driving bar 41 with the groove 45 in the nose of the spindle will lock the draw bar against rotation during the rotative adjustment of the draw bolt both in securing and releasing the cutter.

When the parts are assembled, the disk 19 and driving bar are mounted within the body of the cutter and do not offer projections liable to catch dirt and interfere with the work. The disk 19 serves desirably as a cap to cover and protect the driving bar and the recess in which it is mounted.

It will be understood that the invention is not limited to the specific embodiment shown, but that various deviations may be made therefrom without departing from the spirit and scope of the appended claims.

What is claimed is:—

1. In a device for securing tools to their driving spindles, the combination of the driving spindle having a conically tapered tool receiving end and a transversely extending recess, a tool having a conical bore to fit the conical end of the spindle, and a transversely extending recess, a locking member having a transversely extending driving bar for engaging the transversely extending recesses of the tapered spindle and tool, the transversely extending recess in the end of the tapered spindle being of a depth to afford a space between the bottom of the recess and the driving bar when the conical bore of the tool and the conical end of the spindle are in driving relation, and a draw bar acting upon the locking member.

2. The combination of a spindle having a tapering nose and a transversely extending recess at the end thereof, a tool having a tapering bore fitting the tapering nose of the spindle and provided with a counterbore in the outer face thereof, and locking recesses extending transversely of the counterbore, a disk adapted to be seated in the counterbore of the tool and having a transversely extending driving member registering with the transversely extending recesses of the spindle and tool, and a draw bolt for drawing the tapered bore of the tool tightly onto the tapering nose of the spindle and securing the transversely extending driving member in the recesses of the tool and spindle.

3. A device for securing tools to spindles comprising a member for engagement with a part of a tool, and a draw bolt extending longitudinally through the spindle and connected to said member for drawing the latter against said tool to force a tapered bore of the tool tightly onto a tapered portion of a spindle, said member being formed to enter recesses in said tool and spindle to positively drive the tool from the spindle and a collar threaded to the spindle and locking the draw bolt from longitudinal movement so that upon rotation of the draw bolt in one direction the said member may be moved from locking engagement with the spindle and tool.

4. The combination of a spindle having a tapered nose with a transverse groove in an end thereof, a tool having a groove therein, a driving member for engagement with a part of a tool and formed to enter said grooves, said tool and spindle having a tapered bore in one fitting a tapered portion on the other, and means coöperating with said driving member for pressing the same against said tool part to force the tapered portion and bore into secure engagement, said grooves being sufficiently deep to allow said driving member to enter therein and draw said tapered portion and bore into secure engagement and provide space between the driving member and bottom of the groove when the parts are in driving relation to permit further relative movement of the spindle and tool to insure a driving fit of the tapered portions.

5. In a device of the character described, the combination of the driving spindle having an end of uniform conical taper and a transversely extending recess, a cutter having a uniform conical bore to fit the conical taper of the spindle, a counterbore in the outer face of the cutter and a transversely extending recess, a locking disk adapted to be received into the counterbore of the cutter and having a transversely extending driving bar integral therewith to engage the transversely extending recess in the spindle end when the locking disk is seated in the counterbore of the cutter, the transversely extending recess in the end of the spindle being of a depth to provide a space between the driving bar and the bottom of the recess when the cutter and spindle are in driving relation, and a draw bar acting on the locking disk to seat the cutter to a greater or less extent on the conical end of the spindle.

6. A device for securing tools to spindles comprising a driving member having a bar adapted to enter recesses in the tool and spindle to positively drive the former from the latter, a cover connected to said bar for covering said bar and recesses to prevent entrance of foreign matter between said parts, and a draw member projecting into the spindle and connected to said cover and bar for securing the same to the tool and spindle.

7. A device for securing cutters to spindles, comprising, in combination, a spindle having a conical end, a cutter having a conical bore and a counterbore in the outer face thereof, a disk adapted to be seated in the counterbore of the cutter flush with the face of the cutter, and having a transversely extending driving member adapted to enter recesses in the spindle and cutter, said disk acting to protect the driving bar and engaged recesses from dirt or grit, a draw-bar extending longitudinally of the cutter, and means for setting up the drawbar at the end remote from the cutter.

In testimony whereof, I have signed my name to this specification.

WILLIAM F. GROENE.